United States Patent
Jeon

(10) Patent No.: US 11,102,846 B2
(45) Date of Patent: Aug. 24, 2021

(54) DOWNLINK CONTROL INFORMATION TO SUPPORT UPLINK PARTIAL SUBFRAME TRANSMISSION ON LICENSED ASSISTED ACCESS SECONDARY CELL

(71) Applicant: APPLE INC., Cupertino, CA (US)

(72) Inventor: Jeongho Jeon, San Jose, CA (US)

(73) Assignee: Apple Inc., Cupertino, CA (US)

( * ) Notice: Subject to any disclaimer, the term of this patent is extended or adjusted under 35 U.S.C. 154(b) by 14 days.

(21) Appl. No.: 16/488,187

(22) PCT Filed: Mar. 23, 2018

(86) PCT No.: PCT/US2018/024142
§ 371 (c)(1),
(2) Date: Aug. 22, 2019

(87) PCT Pub. No.: WO2018/175964
PCT Pub. Date: Sep. 27, 2018

(65) Prior Publication Data
US 2020/0022219 A1  Jan. 16, 2020

Related U.S. Application Data

(60) Provisional application No. 62/476,586, filed on Mar. 24, 2017.

(51) Int. Cl.
*H04W 72/12* (2009.01)
*H04W 88/10* (2009.01)
(Continued)

(52) U.S. Cl.
CPC ........... *H04W 88/10* (2013.01); *H04W 16/14* (2013.01); *H04W 72/042* (2013.01); *H04W 72/0446* (2013.01); *H04W 72/1268* (2013.01)

(58) Field of Classification Search
CPC ..... H04L 5/001; H04L 5/0044; H04L 5/0053; H04L 5/1469; H04W 16/14;
(Continued)

(56) References Cited

U.S. PATENT DOCUMENTS

2017/0142743 A1* 5/2017 Yoon ..................... H04W 56/00
2017/0325225 A1* 11/2017 Dinan ............... H04W 72/0446
(Continued)

FOREIGN PATENT DOCUMENTS

WO  2018/175964 A1  9/2018

OTHER PUBLICATIONS

International Search Report and Written Opinion received for International Application No. PCT/US2018/024142, dated Jul. 2, 2018, 16 pages.
(Continued)

*Primary Examiner* — Robert J Lopata
(74) *Attorney, Agent, or Firm* — Fay Kaplun & Marcin, LLP

(57) ABSTRACT

Briefly, in accordance with one or more embodiments, an apparatus of an evolved Node B (eNB) or a next generation Node B (gNB) comprises one or more baseband processors to encode downlink control information (DCI) to be transmitted in a physical downlink control channel (PDCCH) to a user equipment (UE) to schedule an uplink subframe including partial uplink subframe information, and to decode the scheduled uplink subframe from a physical uplink shared channel (PUSCH) received from the UE, and a memory to store the partial uplink subframe information.

20 Claims, 7 Drawing Sheets

(51) Int. Cl.
*H04W 16/14* (2009.01)
*H04W 72/04* (2009.01)

(58) Field of Classification Search
CPC ........... H04W 72/042; H04W 72/0446; H04W 72/1268; H04W 88/10
USPC ........................................................ 370/329
See application file for complete search history.

(56) References Cited

U.S. PATENT DOCUMENTS

| | | | | |
|---|---|---|---|---|
| 2017/0347353 | A1* | 11/2017 | Yerramalli | H04L 1/0031 |
| 2018/0092128 | A1* | 3/2018 | Um | H04W 16/14 |
| 2018/0227838 | A1* | 8/2018 | Hayashi | H04W 72/042 |
| 2018/0302913 | A1* | 10/2018 | Yin | H04W 16/14 |
| 2019/0090126 | A1* | 3/2019 | Hayashi | H04W 72/0446 |
| 2019/0159266 | A1* | 5/2019 | Kim | H04L 5/00 |
| 2020/0383108 | A1* | 12/2020 | Lunttila | H04W 72/0446 |

OTHER PUBLICATIONS

Huawei, "Signaling for PUSCH on UpPTS," Discussion, Aug. 22-26, 2016, 1 page, R1-166145, 3GPP TSG RAN WG1 Meeting #86, Gothenburg, Sweden.
ETRI, "Indication of Starting Symbol for Multi-Subframe Scheduling," Discussion, Aug. 22-26, 2016, 3 pages, R1-167734, 3GPP TSG RAN WG1 Meeting #86, Gothenburg, Sweden.
NTT Docomo, Inc., "Discussion on SRS Design for eLAA UL," Discussion, Feb. 15-19, 2016, 3 pages, R1-160948, 3GPP TSG RAN WG1 Meeting #84, St. Julian's, Malta.

* cited by examiner

DOWNLINK CONTROL INFORMATION TO SUPPORT UPLINK PARTIAL SUBFRAME TRANSMISSION ON LICENSED ASSISTED ACCESS SECONDARY CELL

CROSS-REFERENCE TO RELATED APPLICATIONS

This application is the National Stage Application for International Application No. PCT/US2018/024142 filed Mar. 23, 2018, entitled DOWNLINK CONTROL INFORMATION TO SUPPORT UPLINK PARTIAL SUBFRAME TRANSMISSION ON LICENSED ASSISTED ACCESS SECONDARY CELL, which in turn claims the benefit of U.S. Provisional Application No. 62/476,586 (P117216Z) filed Mar. 24, 2017. Said Application No. PCT/US2018/024142 and said Application No. 62/476,586 are hereby incorporated herein by reference in their entireties.

BACKGROUND

The Third Generation Partnership Project (3GPP) is investigating uplink capacity enhancement for Long-Term Evolution (LTE) enabled physical uplink shared channel (PUSCH) transmission in a special subframe on top of the additional sounding reference signal (SRS) transmission in a special subframe to better utilize network resources. Note that up until Release 12 of the 3GPP standard, the uplink pilot time slot (Opts) symbol duration is either 1 or 2 depending on the special subframe configuration 0-9. Release 13 of the 3GPP standard is directed to full-dimension multiple input, multiple output (FD-MIMO) and introduced a new radio resource control (RRC) parameter to signal the number of additional UpPTS symbols of {2, 4} to the existing special subframe configuration for the purpose of SRS capacity enhancement. Uplink (UL) capacity enhancement in Release 14 of the 3GPP standard defined special subframe configuration 10 which has 6 symbol duration downlink pilot time slot (DwPTS), 2 symbol duration GT, and 6 symbol duration UpPTS. For normal cyclic prefix (NCP), the number of data symbols for PUSCH in UpPTS can be 2, 3, 4, 5, or 6 symbols. One objective of Release 15 of the 3GPP standard for Further Enhanced License Assisted Access (FeLAA) is to define multiple starting and ending positions within a subframe for the downlink and the uplink.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
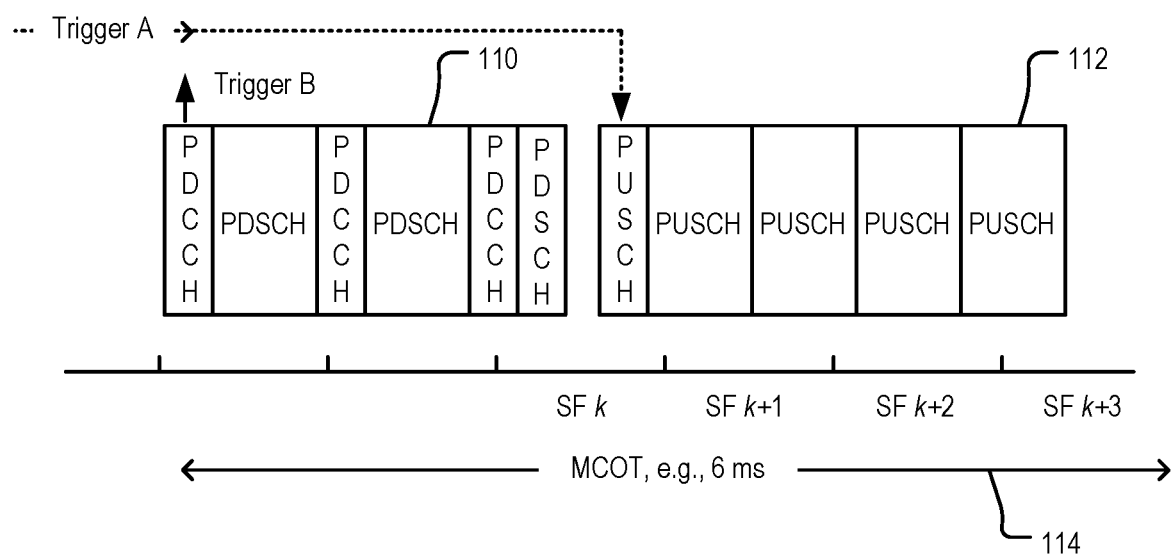
FIG. 1 is a diagram of a use case of a partial uplink subframe for downlink to uplink switching in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a use case of a partial uplink subframe for downlink to uplink switching in accordance with one or more embodiments will be discussed. FIG. 1, illustrates radio frames comprising downlink subframes 110 and uplink subframes 112, each subframe comprising 14 orthogonal frequency-division multiplexing (OFDM) symbols, between an evolved NodeB (eNB) and one or more user equipment (UE) devices. The downlink subframes 110 comprise downlink physical downlink control channel (PDCCH) transmissions and physical downlink shared channel (PDSCH) transmissions, and the uplink subframes 112 comprise physical uplink shared channel (PUSCH) transmissions. The maximum channel occupancy time (MCOT) 114 obtained by the eNB is shared with the associated UEs. With the introduction of UL partial subframes, the switching from the downlink (DL) to the uplink (UL) may be performed flexibly and in a finer granularity.

In a system implement implementing Further Enhanced License Assisted Access (FeLAA) according to the Release 15 of the Third Generation Partnership Project (3GPP) standard, the first and/or last symbols in a subframe to transmit sounding reference signals. As discussed herein, a signaling mechanism may be utilized to indicate to a UE when to use a partial uplink subframe.

Figure 2:
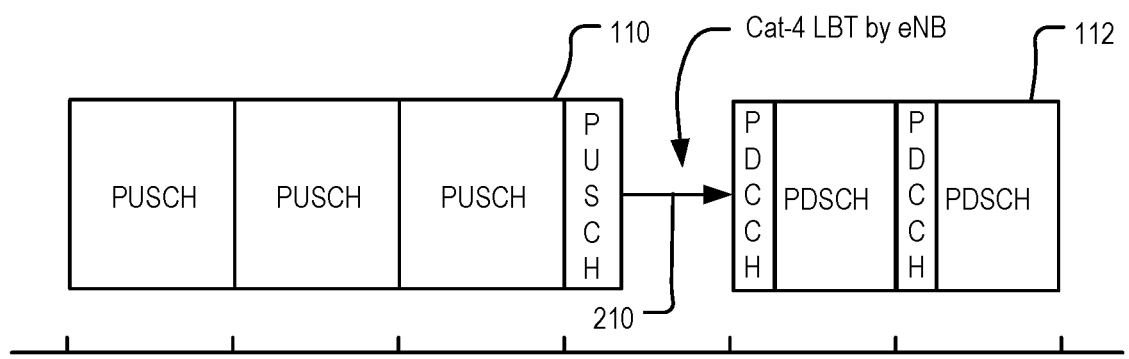
FIG. 2 is a diagram of a use case of a partial uplink subframe to create a gap for listen before talk in accordance with one or more embodiments.

Referring now to FIG. 2, a diagram of a use case of a partial uplink subframe to create a gap for listen before talk in accordance with one or more embodiments will be discussed. As discussed herein, the ending UL subframes may be partial, for example if the MCOT is obtained in the middle of a subframe and therefore ends in the middle of a subframe. To maximally utilize the obtained MCOT, the eNB may schedule a partial UL subframe transmission. Alternatively, it is also possible that an ending partial UL subframe may be utilized to generate a listen before talk (LBT) gap 210, such as a Category 3 or a Category 4 LBT, for a following transmission.

In one or more embodiments, downlink control information (DCI) format 0A/0B/4A/4B may be modified and used to indicate an uplink (UL) partial subframe. Furthermore, the UL burst duration indication in the common PDCCH may be modified. In such embodiments, DCI format 0A/4A may indicate whether the scheduled subframe is partial subframe or not. Whether the scheduled subframe is starting partial subframe or ending partial subframe may be indicated, and the duration of the partial UL subframe may be indicated. Additionally, DCI format 0B/4B may indicate whether the scheduled subframe is partial subframe or not. Whether the starting subframe of the multiple scheduled subframe is partial subframe and/or the ending subframe of the multiple scheduled subframe is partial subframe are indicated, and the duration of the partial UL subframe or partial UP subframes may be indicated.

In further embodiments, the UL burst duration indication may be modified by taking into account the partial UL subframes. The existing signaling may be extended such that a partial UL subframe proceeded by a partial DL subframe in the same subframe may counted as one subframe in the total UL burst duration and signaled. In other words, an offset of 0 is supported. For a partial UL subframe proceeded by a partial DL subframe in the same subframe, the existing signaling is not changed, and the partial UL subframe is not counted towards the signaled UL burst duration. If the partial UL subframe is not proceeded by partial DL in the same subframe, the partial UL subframe may be counted as one subframe in the UL burst duration indication. If the partial UL subframe is not proceeded by partial DL in the same subframe, the partial UL subframe is not counted towards the UL burst duration indication. If a partial UL subframe follows a partial DL subframe in the same subframe, the partial UL is not counted towards the signaled UL burst duration. If a partial UL subframe does not follow a partial DL subframe in the same subframe, the partial UL may be counted towards the signaled UL burst duration.

Downlink control information (DCI) formats 0A/0B/4A/4B are provided for UL scheduling on a License Assisted Access (LAA) secondary SCell are shown in Table 1 and in Table 1, below.

TABLE 1

DCI format 0A/4A for single subframe scheduling

| Field | Bit Length (Format 0A) | Bit Length (Format 4A) |
|---|---|---|
| CIF | 3 | 3 |
| Format 0/1A flag | 1 | . |
| RA | 6 | 6 |
| NDI | 1 | 2 |
| MCS | 5 | 10 |
| RV | 2 | 2 |
| TPC | 2 | 2 |
| CS & OCC | 3 | 3 |
| CQI request | 1-3 | 1-3 |
| SRS request | 1 | 2 |
| PMI (3 or 6 bits depending on # AP) | . | 3/6 |
| HARQ ID | 4 | 4 |
| PUSCH starting position | 2 | 2 |
| Ending gap (12 or 13 symbols) | 1 | 1 |
| SF timing | 4 | 4 |
| LBT type | 1 | 1 |
| Cat 4 priority | 2 | 2 |
| 2-stage indication | 1 | 1 |

TABLE 2

DCI format 0B/4B for multi-subframe scheduling

| Field | Bit Length (Format 0B) | Bit Length (Format 4B) |
|---|---|---|
| CIF | 3 | 3 |
| Format 0/1A flag | . | . |
| RA | 6 | 6 |
| NDI | N | 2N |
| MCS | 5 | 10 |
| RV | N | N |
| TPC | 2 | 2 |
| CS & OCC | 3 | 3 |
| CQI request | 1-3 | 1-3 |
| SRS request | 2 | 2 |
| PMI (3 or 6 bits depending on # AP) | . | 3/6 |
| N scheduled SFs | 1-2 | 1-2 |
| HARQ ID | 4 | 4 |
| PUSCH starting position | 2 | 2 |
| Ending gap (12 or 13 symbols) | 1 | 1 |
| SF timing | 4 | 4 |
| LBT type | 1 | 1 |
| Cat 4 priority | 2 | 2 |
| 2-stage indication | 1 | 1 |

In Release for Further Enhanced License Assisted Access (FeLAA), the DCI formats 0A/0B/4A/4B may be modified as discussed herein to indicate the partial UL subframe as follows. The DCI format 0A/4A for single subframe scheduling may be modified such that the DCI indicates whether the scheduled subframe is a partial subframe or not. DCI format 0A/4A may also indicate whether the scheduled subframe is a starting partial subframe or an ending partial subframe. The duration of the partial UL subframe may be radio resource control (RRC) configured, or the duration also may be also indicated.

The DCI format 0B/4B for multi-subframe scheduling may be modified such that the DCI indicates whether the scheduled subframe is a partial subframe or not. DCI format 0B/4B may also indicate whether the starting subframe of the multiple scheduled subframe is a partial subframe, or whether the ending subframe of the multiple scheduled subframe is partial subframe. The duration of the partial UL subframe may be RRC configured, or the duration also may be indicated. In one or more alternative embodiments, the UL burst duration may be indicated in the common physical downlink control channel (PDCCH) as shown in and described with respect to FIG. 3, below.

Figure 3:
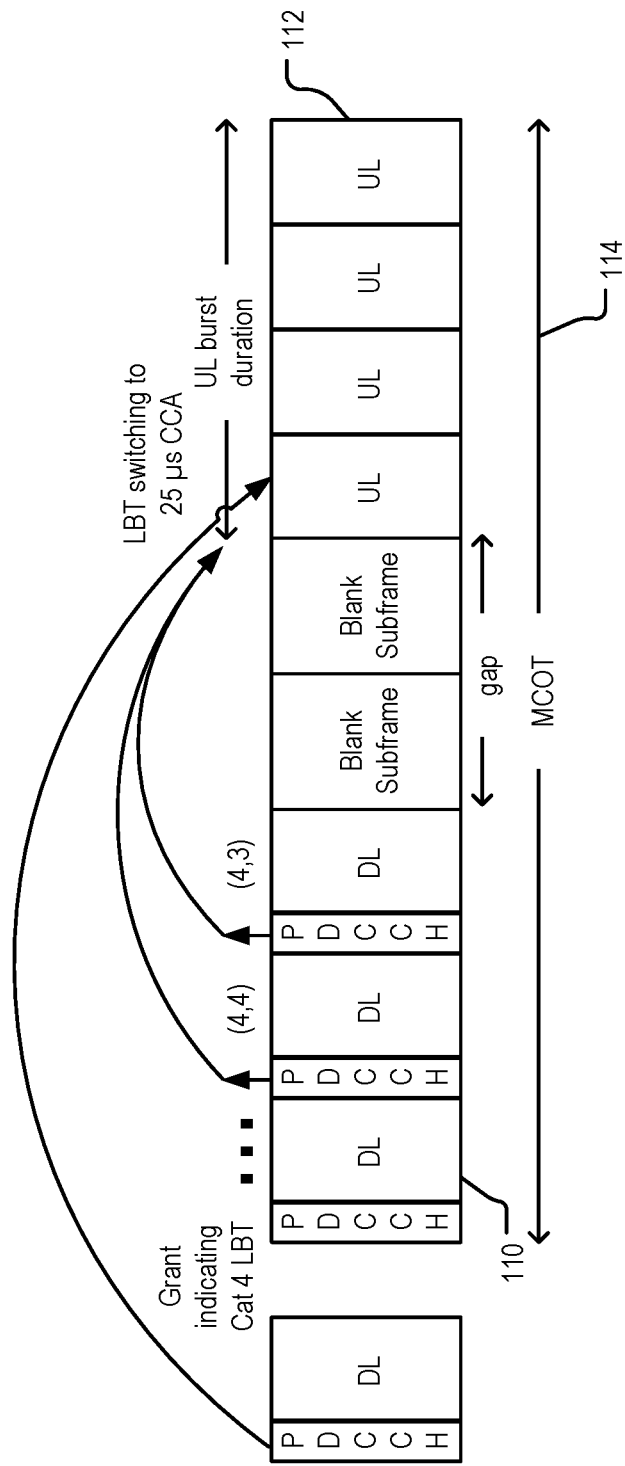
FIG. 3 is a diagram of an uplink burst duration indication in accordance with one or more embodiments.

Referring now to FIG. 3, a diagram of an uplink burst duration indication in accordance with one or more embodiments will be discussed. In some embodiments, a compact PDCCH (C-PDCCH) indicates a pair of values: uplink (UL) burst duration and offset. The UL burst duration is the number of consecutive UL subframes belonging to the same channel occupancy, with the downlink (DL) subframes in the same channel occupancy signaling the UL burst duration. Offset is the number of subframes to the start of an indicated UL burst from the start of the subframe carrying the C-PDCCH. The UE may override the previously indicated Cat. 4 LBT 210 from the eNB to a single interval listen before talk (LBT) if the scheduled UL subframes are entirely contained within the indicated UL burst duration. The UE is not required to receive any DL signals and/or channels in a subframe indicated to be a UL subframe on the carrier. Five bits may be used to jointly express {offset, duration} for all combinations of {{1, 2, 3, 4, 6}, {1, 2, 3, 4, 5, 6}}.

Figure 4:
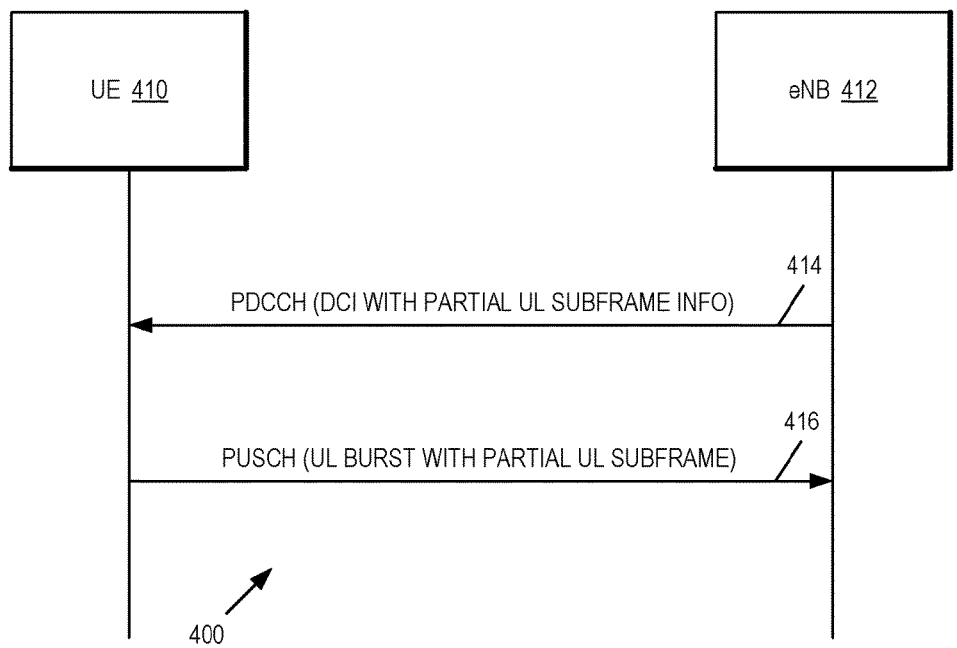
FIG. 4 is a diagram of a process to indicate partial uplink subframe information in downlink control information in accordance with one or more embodiments.

Referring now to FIG. 4, a diagram of a process to indicate partial uplink subframe information in downlink control information in accordance with one or more embodiments will be discussed. As shown in FIG. 4, in process 400 evolved NodeB (eNB) 412 may transmit downlink control information (DCI) to user equipment (UE) 410 in a physical downlink control channel (PDCCH) transmission 414. The DCI may include partial uplink subframe information as discussed herein. The UE 410 transmits an uplink burst in a physical uplink shared channel (PUSCH) transmission 416. The uplink burst may include one or more partial uplink subframes. A description of how one or more uplink subframes and one or more downlink subframes may be handled is shown in and described with respect to FIG. 5, below.

Figure 5:
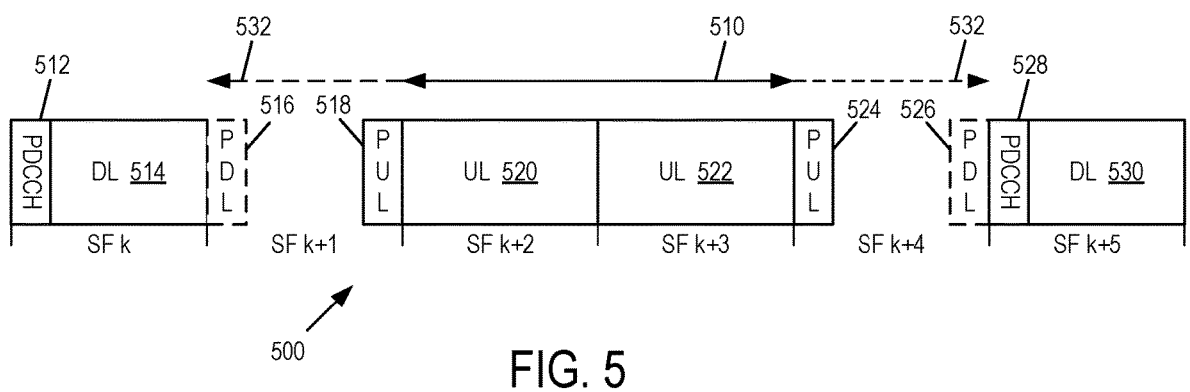
FIG. 5 is a diagram of subframes in which partial uplink subframes and partial downlink subframes may be included in accordance with one or more embodiments.

Referring now to FIG. 5, a diagram of subframes in which partial uplink subframes and partial downlink subframes may be included in accordance with one or more embodiments will be discussed. The subframes 500 of FIG. 5 may include subframe (SF) number k (SF k) through subframe SF k+5 and so on. Physical downlink control channel (PDCCH) 512 may precede a downlink (DL) burst 514 in SF k.

The UL burst duration indication of Release 14 of the 3GPP standard may be modified by taking into account the partial UL subframes. In the case of a partial DL subframe 516 and a partial UL subframe 518 in the same subframe SF k+1, with the existing mechanism, the minimum offset is 1. In other words, the partial UL subframe 518 in the same DL partial subframe 516 cannot be signaled. Thus, in one embodiment, the existing signaling may be extended such that a partial UL subframe 518 in the same partial DL subframe 516 signaling the burst duration can be signaled. In another embodiment, the existing signaling is not changed, and the partial UL subframe 518 in the same signaled DL subframe SF k+1 is not counted towards the signaled UL burst duration. If the partial UL subframe 518 is not proceeded by a partial DL subframe 516 in the same subframe SF k+1, the partial UL subframe 518 may be counted as one subframe in the UL burst duration 510 indication via extension 532. Note that the uplink burst 510 may include uplink subframes such as UL subframe 520 and UL subframe 522. In this case, the eNB shall not transmit any downlink transmission in the same subframe because the UEs are not required to monitor the downlink signals. In another embodiment, if the partial UL subframe 518 is not proceeded by a partial DL subframe 516 in the same subframe SF k+1, the partial UL subframe 518 is not counted towards the UL burst duration 510 indication. In this case, UEs will monitor the downlink signals, and thus the eNB may transmit a partial DL subframe 516 in the same subframe if later the eNB changes the decision.

Considering the case of a partial UL subframe 524 and a partial DL subframe 526 in the same subframe SF k+4, if the eNB 412 plans to send a partial DL subframe 524 preceded by a partial UL subframe 526, the partial UL subframe 524 is not counted towards the signaled UL burst duration 510. If the partial UL subframe 524 is not followed by a partial DL subframe 526 in the same subframe SF k+4, the subframe may be counted as one subframe in the UL burst duration 510 via extension 532 such that the UEs do not monitor the downlink signals. Subsequent transmissions of PDCCH 528 and DL subframe 530 may occur, and so on.

Information in the agreements made in 3GPP Radio Layer 1 (RAN1) working group 1 (Working Group 1) meeting #92 (Feb. 28, 2018 through Mar. 2, 2018) includes the following. The following DCI fields are included for FeLAA operation if the UE is configured on the LAA S Cell with multiple starting or ending positions—i.e. FeLAA PUSCH Mode 1, FeLAA PUSCH Mode 2 (i.e. partial UL starting SF) and/or FeLAA PUSCH Mode 3 (i.e. partial UL ending SF)

DCI format 0A/4A

PUSCH mode (2 bits)

'00' indicating Rel. 14 PUSCH transmission (i.e. subframe PUSCH, PUSCH start [#0/#0+25us/#0+TA+25us/#1], PUSCH end after symbol #12 or 13)

'01' FeLAA PUSCH Mode 1 (i.e. PUSCH starting [#0/#0+25us/#0+TA+25us/#1] or symbol #7 depending on LBT outcome, ending symbol #12 or 13)

'10' FeLAA PUSCH Mode 2 (i.e. PUSCH starting [#7/#7+25us/#7+TA+25us/#8], PUSCH ending after symbol #12 or 13)

'11' FeLAA PUSCH Mode 3 (i.e. PUSCH start [#0/#0+25us/#0+TA+25us/#1], PUSCH ending after symbol #6)

DCI Format 0B/4B

PUSCH Mode 1 (lbit, present if configured with PUSCH Mode 1): '1' indicating, if PUSCH mode 1 is applicable to scheduled PUSCH transmissions in both slots of an UL subframe.

PUSCH Mode 2 (lbit, present if configured with PUSCH Mode 2): '1' indicating, if the PUSCH scheduled in the first subframe of the UL subframe burst is to start [#7/#7+25us/#7+TA+25us/#8].

PUSCH Mode 3 (lbit, present if the configured with PUSCH Mode 3): '1' indicating, that PUSCH in the last subframe of the scheduled UL burst is to end after symbol #6.

The UL ending partial subframe ending at symbol #3 is supported.

TBS scaling factor for the partial subframe ending at symbol #3 is 1/8.

The UL partial subframe ending at symbol #3 is signaled via Mode 3 indication and the reinterpretation of bit field for PUSCH ending position field (#3 or #6).

UCI transmission in this case is not supported.

Figure 6:
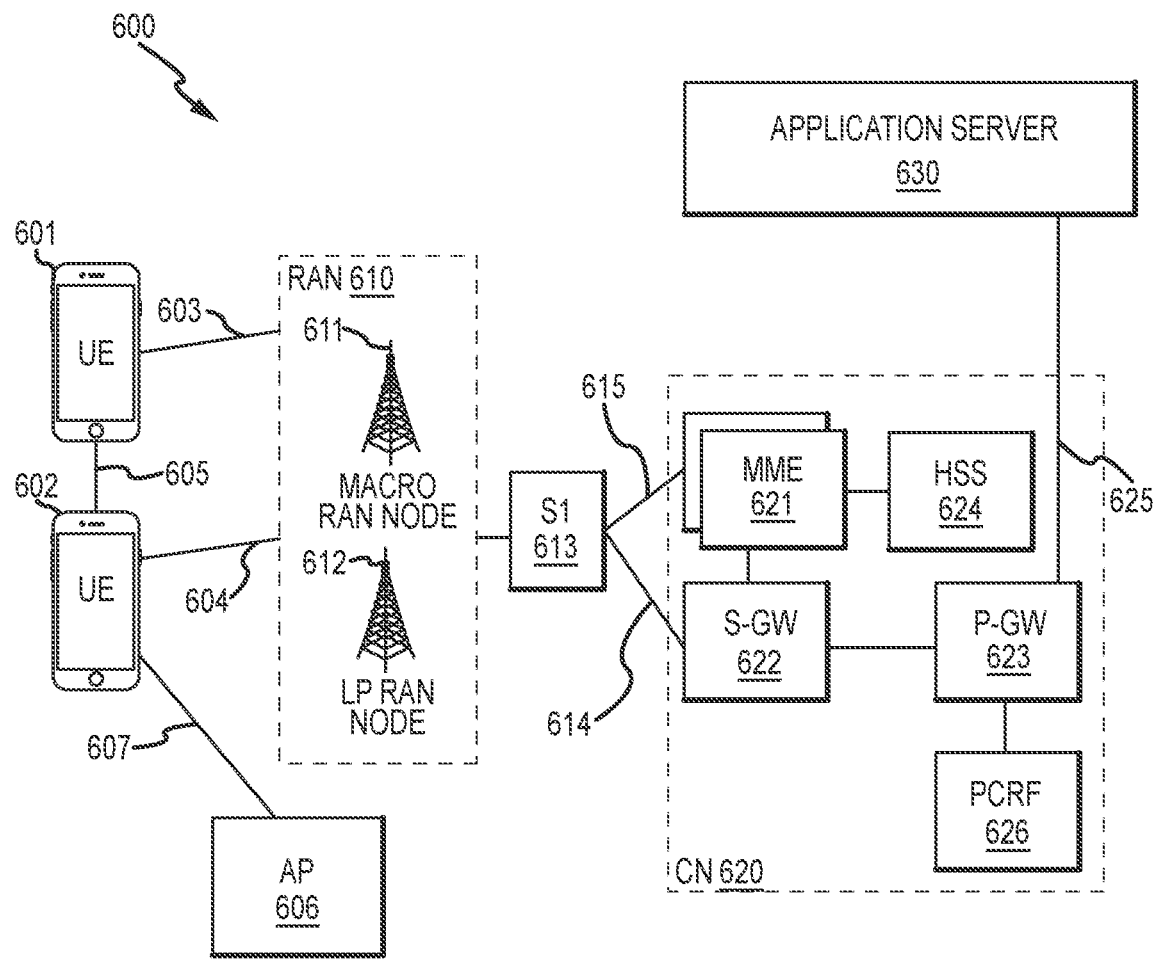
FIG. 6 illustrates an architecture of a system of a network in accordance with some embodiments.

FIG. 6 illustrates an architecture of a system 600 of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi®) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 interface 613. In embodiments, the CN 620 may be an evolved packet core (EPC) network, a NextGen Packet Core (NPC) network, or some other type of CN. In this embodiment the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Enforcement Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

Figure 7:
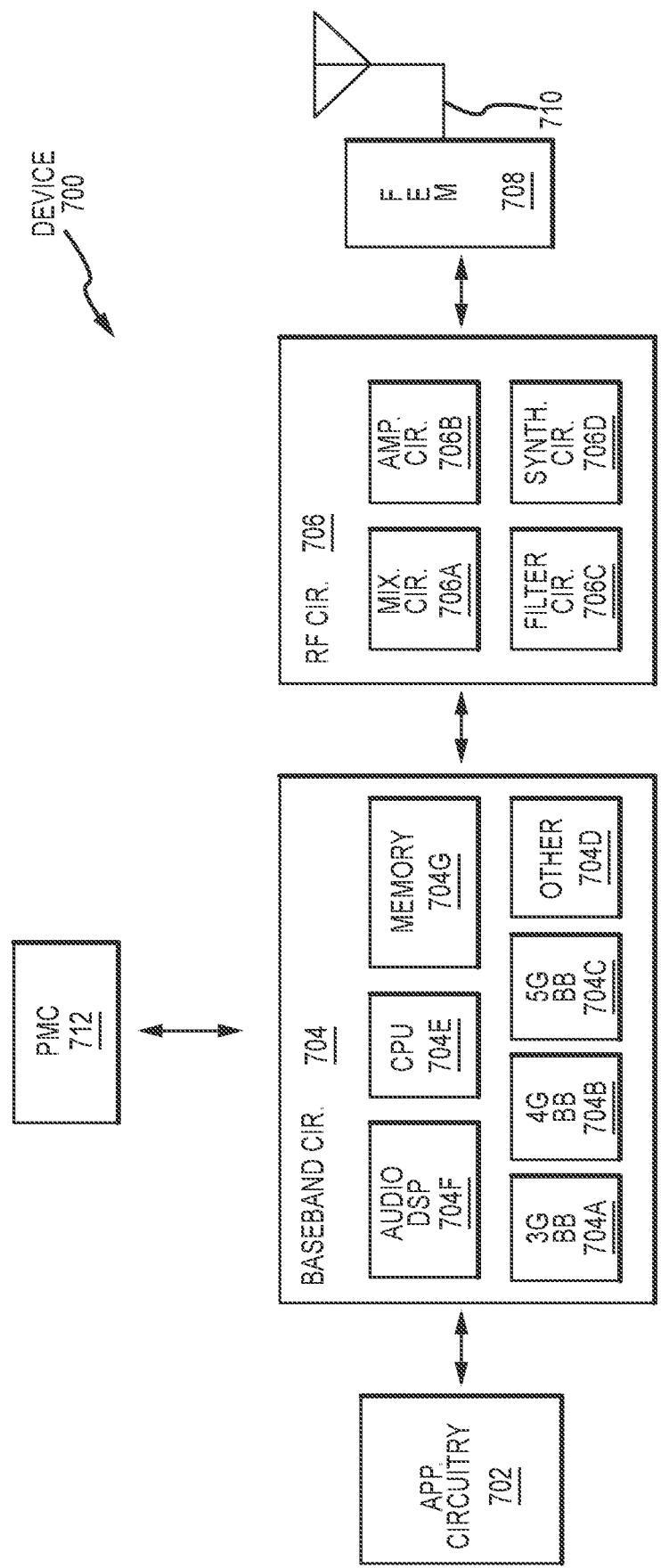
FIG. 7 illustrates example components of a device in accordance with some embodiments.

FIG. 7 illustrates example components of a device 700 in accordance with some embodiments. In some embodiments, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE or a RAN node. In some embodiments, the device 700 may include less elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect. In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage-controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM 708, or in both the RF circuitry 706 and the FEM 708.

In some embodiments, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device is included in a UE. The PMC 712 may increase the power conversion efficiency while providing desirable implementation size and heat dissipation characteristics.

While FIG. 7 shows the PMC 712 coupled only with the baseband circuitry 704. However, in other embodiments, the PMC 712 may be additionally or alternatively coupled with, and perform similar power management operations for, other components such as, but not limited to, application circuitry 702, RF circuitry 706, or FEM 708.

In some embodiments, the PMC 712 may control, or otherwise be part of, various power saving mechanisms of the device 700. For example, if the device 700 is in an RRC Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RCC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used execute Layer 3, Layer 2, or Layer 1 functionality, while processors of the application circuitry 704 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
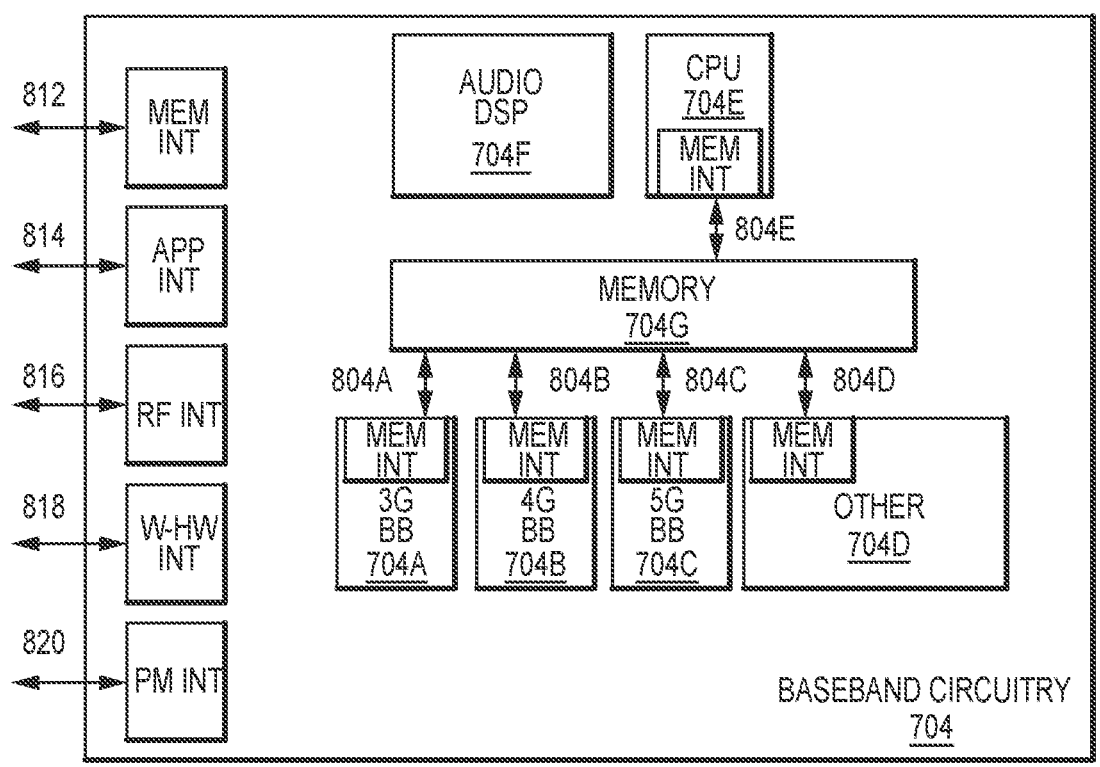
FIG. 8 illustrates example interfaces of baseband circuitry in accordance with some embodiments.

FIG. 8 illustrates example interfaces of baseband circuitry in accordance with some embodiments. As discussed above, the baseband circuitry 704 of FIG. 7 may comprise processors 704A-704E and a memory 704G utilized by said processors. Each of the processors 704A-704E may include a memory interface, 804A-804E, respectively, to send/receive data to/from the memory 704G.

The baseband circuitry 704 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712.

The following are example implementations of the subject matter described herein. It should be noted that any of the examples and the variations thereof described herein may be used in any permutation or combination of any other one or more examples or variations, although the scope of the claimed subject matter is not limited in these respects. In example one, an apparatus of an evolved Node B (eNB) or a next generation Node B (gNB) comprises one or more baseband processors to encode downlink control information (DCI) to be transmitted in a physical downlink control channel (PDCCH) to a user equipment (UE) to schedule an uplink subframe including partial uplink subframe information, and to decode the scheduled uplink subframe from a physical uplink shared channel (PUSCH) received from the UE, and a memory to store the partial uplink subframe information. Example two may include the subject matter of example one or any of the examples described herein, wherein the DCI comprises format 0A/4A and indicates whether the scheduled subframe is a partial uplink subframe. Example three may include the subject matter of example one or any of the examples described herein, wherein the DCI indicates whether the scheduled subframe is a starting partial uplink subframe or and ending partial uplink subframe. Example four may include the subject matter of example one or any of the examples described herein, wherein the DCI indicates a duration of the partial subframe. Example five may include the subject matter of example one or any of the examples described herein, wherein the DCI comprises format 0B/4B and indicates whether the scheduled subframe is partial uplink subframe. Example six may include the subject matter of example one or any of the examples described herein, wherein the DCI indicates whether the schedule subframe is starting partial uplink subframe or an ending partial uplink subframe of multiple scheduled subframes. Example seven may include the subject matter of example one or any of the examples described herein, wherein the DCI indicates a duration of one or more partial uplink subframes. Example eight may include the subject matter of example one or any of the examples described herein, wherein the DCI information indicates a duration of an uplink burst and whether the uplink burst is extended to accommodate one or more partial uplink subframes. Example nine may include the subject matter of example one or any of the examples described herein, wherein the partial uplink subframe preceded by a partial downlink subframe in a same subframe is counted and signaled as one subframe in the uplink burst duration to support an offset of 0. Example ten may include the subject matter of example one or any of the examples described herein, wherein the partial uplink subframe preceded by a partial downlink subframe in a same subframe is not counted as one subframe in the uplink burst duration. Example eleven may include the subject matter of example one or any of the examples described herein, wherein if the partial uplink subframe is not preceded by partial downlink subframe in a same subframe, the partial uplink subframe is counted as one subframe in the uplink burst duration. Example twelve may include the subject matter of example one or any of the examples described herein, wherein if the partial uplink subframe is not preceded by a partial downlink subframe in a same subframe, the partial uplink subframe is not counted towards the uplink burst duration. Example thirteen may include the subject matter of example one or any of the examples described herein, wherein if the partial uplink subframe follows a partial downlink subframe in a same subframe, the partial uplink subframe is not counted towards the uplink burst duration. Example fourteen may include the subject matter of example one or any of the examples described herein, wherein if the partial uplink subframe does not follow a partial downlink subframe in a same subframe, the partial uplink subframe is counted towards the uplink burst duration.

In example fifteen, one or more machine readable media may have instructions thereon that, when executed by an apparatus of an evolved Node B (eNB) or a next generation Node B (gNB), result in encoding downlink control information (DCI) to be transmitted in a physical downlink control channel (PDCCH) to a user equipment (UE) to schedule an uplink subframe including partial uplink subframe information, and decoding the scheduled uplink subframe from a physical uplink shared channel (PUSCH) received from the UE. Example sixteen may include the subject matter of example fifteen or any of the examples described herein, wherein the DCI comprises format 0A/4A and indicates whether the scheduled subframe is a partial uplink subframe. Example seventeen may include the subject matter of example fifteen or any of the examples described herein, wherein the DCI indicates whether the scheduled subframe is a starting partial uplink subframe or and ending partial uplink subframe. Example eighteen may include the subject matter of example fifteen or any of the examples described herein, wherein the DCI indicates a duration of the partial subframe. Example nineteen may include the subject matter of example fifteen or any of the examples described herein, wherein the DCI comprises format 0B/4B and indicates whether the scheduled subframe is partial uplink subframe. Example twenty may include the subject matter of example fifteen or any of the examples described herein, wherein the DCI indicates whether the schedule subframe is starting partial uplink subframe or an ending partial uplink subframe of multiple scheduled subframes. Example twenty-one may include the subject matter of example fifteen or any of the examples described herein, wherein the DCI indicates a duration of one or more partial uplink subframes. Example twenty-two may include the subject matter of example fifteen or any of the examples described herein, wherein the DCI information indicates a duration of an uplink burst and whether the uplink burst is extended to accommodate one or more partial uplink subframes. Example twenty-three may include the subject matter of example fifteen or any of the examples described herein, wherein the partial uplink subframe preceded by a partial downlink subframe in a same subframe is counted and signaled as one subframe in the uplink burst duration to support an offset of 0. Example twenty-four may include the subject matter of example fifteen or any of the examples described herein, wherein the partial uplink subframe preceded by a partial downlink subframe in a same subframe is not counted as one subframe in the uplink burst duration. Example twenty-five may include the subject matter of example fifteen or any of the examples described herein, wherein if the partial uplink subframe is not preceded by partial downlink subframe in a same subframe, the partial uplink subframe is counted as one subframe in the uplink burst duration. Example twenty-six may include the subject matter of example fifteen or any of the examples described herein, wherein if the partial uplink subframe is not preceded by a partial downlink subframe in a same subframe, the partial uplink subframe is not counted towards the uplink burst duration. Example twenty-seven may include the subject matter of example fifteen or any of the examples described herein, wherein if the partial uplink subframe follows a partial downlink subframe in a same subframe, the partial uplink subframe is not counted towards the uplink burst duration. Example twenty-eight may include the subject matter of example fifteen or any of the examples described herein, wherein if the partial uplink subframe does not follow a partial downlink subframe in a same subframe, the partial uplink subframe is counted towards the uplink burst duration.

In example twenty-nine, an apparatus of an evolved Node B (eNB) or a next generation Node B (gNB) comprises means for encoding downlink control information (DCI) to be transmitted in a physical downlink control channel (PDCCH) to a user equipment (UE) to schedule an uplink subframe including partial uplink subframe information, and means for decoding the scheduled uplink subframe from a physical uplink shared channel (PUSCH) received from the UE. Example thirty may include the subject matter of example twenty-nine or any of the examples described herein, wherein the DCI comprises format 0A/4A and indicates whether the scheduled subframe is a partial uplink subframe. Example thirty-one may include the subject matter of example twenty-nine or any of the examples described herein, wherein the DCI indicates whether the scheduled subframe is a starting partial uplink subframe or and ending partial uplink subframe. Example thirty-two may include the subject matter of example twenty-nine or any of the examples described herein, wherein the DCI indicates a duration of the partial subframe. Example thirty-three may include the subject matter of example twenty-nine or any of the examples described herein, wherein the DCI comprises format 0B/4B and indicates whether the scheduled subframe is partial uplink subframe. Example thirty-four may include the subject matter of example twenty-nine or any of the examples described herein, wherein the DCI indicates whether the schedule subframe is starting partial uplink subframe or an ending partial uplink subframe of multiple scheduled subframes. Example thirty-five may include the subject matter of example twenty-nine or any of the examples described herein, wherein the DCI indicates a duration of one or more partial uplink subframes. Example thirty-six may include the subject matter of example twenty-nine or any of the examples described herein, wherein the DCI information indicates a duration of an uplink burst and whether the uplink burst is extended to accommodate one or more partial uplink subframes. Example thirty-seven may include the subject matter of example twenty-nine or any of the examples described herein, wherein the partial uplink subframe preceded by a partial downlink subframe in a same subframe is counted and signaled as one subframe in the uplink burst duration to support an offset of 0. Example thirty-eight may include the subject matter of example twenty-nine or any of the examples described herein, wherein the partial uplink subframe preceded by a partial downlink subframe in a same subframe is not counted as one subframe in the uplink burst duration. Example thirty-nine may include the subject matter of example twenty-nine or any of the examples described herein, wherein if the partial uplink subframe is not preceded by partial downlink subframe in a same subframe, the partial uplink subframe is counted as one subframe in the uplink burst duration. Example forty may include the subject matter of example twenty-nine or any of the examples described herein, wherein if the partial uplink subframe is not preceded by a partial downlink subframe in a same subframe, the partial uplink subframe is not counted towards the uplink burst duration. Example forty-one may include the subject matter of example twenty-nine or any of the examples described herein, wherein if the partial uplink subframe follows a partial downlink subframe in a same subframe, the partial uplink subframe is not counted towards the uplink burst duration. Example forty-two may include the subject matter of example twenty-nine or any of the examples described herein, wherein if the partial uplink subframe does not follow a partial downlink subframe in a same subframe, the partial uplink subframe is counted towards the uplink burst duration. In example forty-three, machine-readable storage may include machine-readable instructions, when executed, to realize an apparatus as claimed in any preceding claim.

Although the claimed subject matter has been described with a certain degree of particularity, it should be recognized that elements thereof may be altered by persons skilled in the art without departing from the spirit and/or scope of claimed subject matter. It is believed that the subject matter pertaining to downlink control information to support uplink partial subframe transmission on licensed assisted access secondary cell and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of an evolved Node B (eNB) or a next generation Node (gNB), comprising:
   one or more baseband processors configured to:
     encode downlink control information (DCI) to be transmitted in a physical downlink control channel (PDCCH) to a user equipment (UE) to schedule an uplink subframe including partial uplink subframe information, and
     decode the scheduled uplink subframe from a physical uplink shared channel (PUSCH) received from the UE, wherein the DCI information indicates a duration of an uplink burst and whether the uplink burst accommodates one or more partial uplink subframes; and
   a memory to store the partial uplink subframe information.

2. The apparatus of claim 1, wherein the DCI comprises format 0A/4A and indicates whether the scheduled subframe is a partial uplink subframe.

3. The apparatus of claim 2, wherein the DCI indicates whether the scheduled subframe is a starting partial uplink subframe or and ending partial uplink subframe.

4. The apparatus of claim 2, wherein the DCI indicates a duration of the partial subframe.

5. The apparatus of claim 1, wherein the DCI comprises format 0B/4B and indicates whether the scheduled subframe is partial uplink subframe.

6. The apparatus of claim 5, wherein the DCI indicates whether the schedule subframe is starting partial uplink subframe or an ending partial uplink subframe of multiple scheduled subframes.

7. The apparatus of claim 5, wherein the DCI indicates a duration of one or more partial uplink subframes.

8. The apparatus of claim 1, wherein the partial uplink subframe preceded by a partial downlink subframe in a same subframe is counted and signaled as one subframe in the uplink burst duration to support an offset of 0.

9. The apparatus of claim 1, wherein the partial uplink subframe preceded by a partial downlink subframe in a same subframe is not counted as one subframe in the uplink burst duration.

10. The apparatus of claim 1, wherein if the partial uplink subframe is not preceded by partial downlink subframe in a same subframe, the partial uplink subframe is counted as one subframe in the uplink burst duration.

11. The apparatus of claim 1, wherein if the partial uplink subframe is not preceded by a partial downlink subframe in a same subframe, the partial uplink subframe is not counted towards the uplink burst duration.

12. The apparatus of claim 1, wherein if the partial uplink subframe follows a partial downlink subframe in a same subframe, the partial uplink subframe is not counted towards the uplink burst duration.

13. The apparatus of claim 1, wherein if the partial uplink subframe does not follow a partial downlink subframe in a same subframe, the partial uplink subframe is counted towards the uplink burst duration.

14. A user equipment (UE), comprising:
radio frequency circuitry configured to communicate with a base station; and
one or more baseband processors configured to:
  decode downlink control information (DCI) received from the base station in a physical downlink control channel (PDCCH), the DCI comprising schedule information for an uplink subframe including a duration of an uplink burst and whether the uplink burst accommodates one or more partial uplink subframes, and
  transmit the scheduled uplink subframe in a physical uplink shared channel (PUSCH).

15. The UE of claim 14, wherein the partial uplink subframe preceded by a partial downlink subframe in a same subframe is counted and signaled as one subframe in the uplink burst duration to support an offset of 0.

16. The UE of claim 14, wherein the partial uplink subframe preceded by a partial downlink subframe in a same subframe is not counted as one subframe in the uplink burst duration.

17. The UE of claim 14, wherein if the partial uplink subframe is not preceded by partial downlink subframe in a same subframe, the partial uplink subframe is counted as one subframe in the uplink burst duration.

18. The UE of claim 14, wherein if the partial uplink subframe is not preceded by a partial downlink subframe in a same subframe, the partial uplink subframe is not counted towards the uplink burst duration.

19. The NE of claim 14, wherein if the partial uplink subframe follows a partial downlink subframe in a same subframe, the partial uplink subframe is not counted towards the uplink burst duration.

20. The UE of claim 14, wherein the DCI indicates whether the scheduled subframe is a starting partial uplink subframe or and ending partial uplink subframe.

* * * * *